US012628826B2

(12) United States Patent
Schilling et al.

(10) Patent No.: US 12,628,826 B2
(45) Date of Patent: May 19, 2026

(54) FUNGICIDAL COMPOSITION

(71) Applicants: UPL Corporation Limited, Port Louis (MU); UPL Europe LTD, Warrington (GB)

(72) Inventors: Brian Schilling, Barriere (CA); Trent McCrea, Parkland County (CA)

(73) Assignees: UPL CORPORATION LIMITED, Port Louis (MU); UPL EUROPE LTD, Warrington (GB)

( * ) Notice: Subject to any disclaimer, the term of this patent is extended or adjusted under 35 U.S.C. 154(b) by 0 days.

(21) Appl. No.: 18/633,019

(22) Filed: Apr. 11, 2024

(65) Prior Publication Data

US 2024/0251796 A1      Aug. 1, 2024

Related U.S. Application Data

(63) Continuation of application No. 17/381,665, filed on Jul. 21, 2021, now Pat. No. 11,998,011.

(60) Provisional application No. 63/054,573, filed on Jul. 21, 2020.

(51) Int. Cl.
| | |
|---|---|
| *A01N 43/653* | (2006.01) |
| *A01N 37/46* | (2006.01) |
| *A01N 43/32* | (2006.01) |
| *A01P 3/00* | (2006.01) |

(52) U.S. Cl.
CPC ........... *A01N 43/653* (2013.01); *A01N 37/46* (2013.01); *A01N 43/32* (2013.01); *A01P 3/00* (2021.08)

(58) Field of Classification Search
CPC ....... A01N 43/32; A01N 25/00; A01N 43/653
See application file for complete search history.

(56) References Cited

U.S. PATENT DOCUMENTS

| | | | | |
|---|---|---|---|---|
| 11,998,011 | B2 * | 6/2024 | Schilling | ............... A01N 37/46 |
| 2008/0269174 | A1 | 10/2008 | Brandl et al. | |
| 2014/0200140 | A1 | 7/2014 | Ikeda | |
| 2015/0094203 | A1 | 4/2015 | Ikeda | |
| 2022/0110324 | A1 | 4/2022 | Shilling et al. | |
| 2023/0200392 | A1 * | 6/2023 | Panchatsharam | ...... A01N 43/32 |
| | | | | 514/383 |

FOREIGN PATENT DOCUMENTS

| | | | | |
|---|---|---|---|---|
| EP | | 2000028 A1 | 12/2008 | |
| WO | WO-2012035670 A1 * | | 3/2012 | ............. A01N 37/46 |
| WO | | 2019244084 A2 | 12/2019 | |

OTHER PUBLICATIONS

World of Plants, https://worldofplants.ai/en/%D9%84%D9%81%D8%AD%D8%A9-%D8%A7%D9%84%D8%A3%D8%B3%D9%83%D9%88%D9%83%D9%8A%D8%AA%D8%A7-%D8%B9%D9%84%D9%89-%D8%A7%D9%84%D8%A8%D9%82%D9%88%D9%84%D9%8A%D8%A7%D8%AA-ascochyta-blight-of-legumes/?srsltid=AfmBOoqZtlOdMqfxIXJOa0Bmc-OsKSq3d-lpyCHMeO7CkCgC75_K-SHn, no pag. or date.*

Anonymous; "Rancona V100 Pro FS" [Product Label]; Cary, NC; MacDermid Agricultural Solutions, Inc.; 2019; 11 pages.

Anonymous; "South Dakota State Pest Management Guide"; available online at "https://extension.sdstate.edu/sites/default/files/2019-01/p.00011.pdf"; 2019; 71 pages.

Anonymous; Rancona CTS [Product Label]; EPA Reg. #400-592; Waterbury, CT; MacDermid Agricultural Solutions, Inc.; 2016; 9 pages.

Anonymous; Rancona Trio [Product Label]; Guelph, ON, Canada; Arysta LifeScience Canada, Inc.; 2017; 8 pages.

International Search Report and Written Opinion for International Application PCT/IB2021/056587; International Filing Date: Jul. 21, 2021; Date of Mailing: Oct. 27, 2021; 13 pages.

Johnson, H.; "Rancona V PD EPA Registration Notice"; EPA Reg. No. 400-606; US Environmental Protection Agency; 2016; 8 pages.

Smith, Damon, et al. Aphanomyces Root Rot Management in Alfalfa. Soil Science Extension. UW- Madison Plant Pathology. 2014. 3 pages.

Zillinsky, F.; "Common Diseases of Small Grain Cereals: A Guide to Identification"; CIMMYT, Mexico; 1983; 141 pages.

Office Action for Colombian Application No. NC2023/0000642, Dated: Dec. 5, 2025; 7 pages, English translation.

* cited by examiner

*Primary Examiner* — Erin E Hirt

(74) *Attorney, Agent, or Firm* — CANTOR COLBURN LLP

(57)      ABSTRACT

Described herein are fungicidal compositions and methods of controlling and/or suppressing phytopathogenic fungi and fungus-like pathogens and maintaining crop health. Particularly described are fungicidal compositions and methods of controlling the phytopathogenic fungi and the *Aphanomyces* fungus-like pathogen and maintaining crop health in crops susceptible to infection.

6 Claims, No Drawings

FUNGICIDAL COMPOSITION

CROSS REFERENCE TO RELATED APPLICATIONS

This application is a continuation of U.S. application Ser. No. 17/381,665 filed on Jul. 21, 2021, which claims priority to U.S. Provisional Application 63/054,573 filed on Jul. 21, 2020 and Canadian Application No. 3087467 filed on Jul. 21, 2020, both of which are incorporated herein by reference in its entirety.

FIELD OF INVENTION

The present disclosure relates to a fungicidal composition effective against phytopathogenic fungi and fungus-like pathogens. The present disclosure also relates to a method for the prevention and/or treatment of root rot disease caused by the *Aphanomyces* plant pathogen in plants.

BACKGROUND

*Aphanomyces euteiches* belongs to the class Oomycete (syn. Peronosporomycete), which is a large (between 600 and 1500 species) and phylogenically distinct group of eukaryotes, including the most numerous, most important, and earliest known water moulds *Aphanomyces*. *Aphanomyces* has a number of legume host plants, of which peas and lentils are the most susceptible pulse crops to infection.

*Aphanomyces* root rot (ARR) infection can occur at any time in the growing season. It is caused by *Aphanomyces euteiches Drechs.* (*A. euteiches*), which is distinguished from most other soil-borne pathogens by the formation of thick-walled oospores. These oospores allow the pathogen to survive in the soil during harsh winter conditions and can cause severe root damage at all growth stages of its host. Oospores can germinate to produce vegetative hyphae that can directly infect the plant root. Alternatively, indirect germination allows oospores to form sporangia which release mobile zoospores. These zoospores detect chemical signals in root exudates from suitable host plants, and swim through water-filled pores toward the roots where hyphae are produced. Hyphae spread throughout the root tissue, then into the below-ground stem, and eventually the entire root system is infected and colonized. A few days after infection, *Aphanomyces* enters its sexual stage and produces oospores, which can survive in the soil for over 10 years and are the primary source of inoculum for future infections in susceptible crops. Oospore production can occur in as little as 10 to 14 days after the first root infection.

There is a significant increase in pea cultivation in North America (Canada and the United States). At present, ARR is one of the major limitations to pea as well as legume production worldwide. The longevity of *A. euteiches* oospores as detailed above, makes the management of ARR difficult. Most often roots are infected with a pathogen complex. Even the symptom expression of this pathogen is not clear. A number of soil-borne pathogens have been reported to be involved in root rot complex, including *A. euteiches, Fusarium* spp., *Pythium* spp., *Phytophthora* spp., and *Rhizoctonia solani* Kühn. Pea root rot complex has been reported to be a serious problem in field pea production in Canada and worldwide.

*Aphanomyces* is an extremely difficult disease for Canadian Pulse growers. Estimation of crop losses due to *A. euteiches* is difficult to establish as numerous factors, including the combination of several common soil fungi that cause root rot diseases. When root rot is severe, yield reduction can be as high as about 70%.

In view of *Aphanomyces euteiches* being a soilborne water-mould pathogen, and not a fungus, most fungicide seed treatments that are efficient at controlling other root rots like *Fusarium* do not necessarily provide the desired control of *Aphanomyces*. Moreover, to compound the problem, once established, *Aphanomyces* spreads through the root system throughout the season, often causing major crop losses at the flowering stage itself. Therefore, *Aphanomyces* continues to be a difficult disease to identify solutions and management options.

*Asocochyta* blight, bacterial blight, root rot, damping off, downy and powdery mildew and *fusarium* wilt, are some of the other diseases that also afflict leguminous plants. *Asocochyta* blight is caused by a complex of fungi, *Ascochyta pisi, Phoma medicaginis* var. *pinodella* (*A. pinodella*), and *Mycosphaerella pinodes*, which survive through the winter months in plant debris or are introduced during planting season on infected pea seeds. There is an absence of an effective fungicidal treatment mechanism available to control *Asocochyta* blight, therefore, a preventative measure such as crop rotation with non-susceptible crops on a yearly basis, is usually recommended.

Infection characterized by pea root rot is associated with seed decay, damping-off, seedling blight, root rot, and wilt; however, the identity of the causal organisms cannot be determined solely by examining the symptoms.

Thus, considering the difficulty in determining the symptoms of the disease and the vast challenges encountered in effectively controlling the root rot disease in plants, there is a need for an alternate treatment strategy for the control and suppression of phytopathogenic fungi and *Aphanomyces* fungus-like pathogen accompanied with an increase in the yield of crops and its good health.

SUMMARY OF INVENTION

In an aspect, a fungicidal combination for controlling phytopathogenic fungi and fungus-like pathogens comprises
    (a) a triazole fungicide,
    (b) an acylalanine fungicide, and
    (c) a succinate dehydrogenase inhibitor (SDHI).

In an aspect, provided is a fungicidal combination for controlling phytopathogenic fungi and fungus-like pathogens, said composition comprising ipconazole, metalaxyl, and carboxin as active components.

In an aspect, the fungicidal composition described herein controls phytopathogenic fungi and fungus-like pathogens, particularly the *Aphanomyces* fungus-like pathogen, particularly in legume crop plants.

In an aspect, a fungicidal composition comprises fungicidally effective amounts of ipconazole, metalaxyl and carboxin (carbathiin) as active components, wherein the composition is used to prevent and/or to treat root rot disease caused by *Aphanomyces* fungus-like pathogen.

In another aspect, a fungicidal composition comprises ipconazole, metalaxyl and carboxin as active components, wherein the composition is used to prevent and/or treat root rot disease in legume crop plants caused by the *Aphanomyces* fungus-like pathogen, *Aphanomyces euteiches*.

In one aspect, a method for controlling or suppressing the growth of phytopathogenic fungi comprises contacting or applying a fungicidal composition comprising fungicidally effective amounts of at least one triazole fungicide, at least one acylalanine fungicide, and at least one succinate dehydrogenase inhibitor (SDHI) for controlling phytopathogenic fungi and fungus-like pathogens, particularly *Aphanomyces* fungus-like pathogen in legume crop plants.

In one preferred aspect, a method for controlling or preventing the growth of phytopathogenic fungi and fungus-like pathogens, particularly *Aphanomyces*, comprises contacting or applying a fungicidal composition comprising ipconazole, metalaxyl and carboxin (carbathiin) to seeds, foliage or to the locus of legume crop plants susceptible to phytopathogenic fungi and fungus-like pathogens, particularly *Aphanomyces* fungus-like pathogen.

In another aspect, a method for controlling *Aphanomyces* fungus in a plant and/or improving the health of a plant comprises treating the plant with a composition comprising ipconazole, metalaxyl and carboxin.

In another aspect, the present disclosure provides the use of the compositions described herein for controlling root rot disease in plants and the improvement of the health of a plant.

In another aspect, the present disclosure relates to a process for increasing the crop yield in *Aphanomyces*-infested soils.

DETAILED DESCRIPTION

It is an object to provide agricultural methods and compositions which result in a good inhibitory efficiency against harmful phytopathogenic fungi and fungus-like pathogens.

It is an object to provide methods and compositions that result in an improvement in the health of crop plants which are susceptible to infection by phytopathogenic fungi and fungus-like pathogens.

It is an object to provide a method for efficiently controlling and inhibiting the growth and spread of *Aphanomyces* sp. and phytopathogenic fungi in crop plants, preferably in legume crops.

It is an object to provide a method for maintaining and improving plant health in crop plants, preferably in legume crops, which are susceptible to infection by *Aphanomyces* sp. and phytopathogenic fungi.

It is an object to provide a fungicidal combination which exhibits an efficient inhibitory potential against phytopathogenic fungi and fungus-like pathogens, preferably *Aphanomyces* sp. in crop plants, preferably legume crops.

It is an object to provide a fungicidal combination which results in an improvement in the health of crop plants susceptible to infection by *Aphanomyces* sp., preferably legume crops.

It is one more object to provide a fungicidal composition which provides for the inhibition of fungal root rot diseases caused by *Aphanomyces* spp. accompanied with an improvement in the growth parameters and yield of crop plants, preferably legume crops.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of materials/ingredients used in the specification are to be understood as being modified in all instances by the term "about".

Thus, before describing the present invention in detail, it is to be understood that this invention is not limited to particularly exemplified systems or process parameters that may of course, vary. It is also to be understood that the terminology used herein is for the purpose of describing particular embodiments of the invention only and is not intended to limit the scope of the invention in any manner. The use of examples anywhere in this specification including examples of any terms discussed herein is illustrative only, and in no way limits the scope and meaning of the invention or of any exemplified term.

It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances.

As used herein, the terms "comprising" "including," "having," "containing," "involving," and the like are to be understood to be open-ended, i.e., to mean including but not limited to.

The compound name carboxin as used herein refers to "carbathiin" and "carbathiinne" which are used in Canada and references to the said compound may be used interchangeably herein.

The term "plant propagation material" refers to the parts of the plant, such as seeds, which can be used for the propagation of the plant and vegetative plant material. There may be mentioned, e.g., the seeds (in the strict sense), roots, fruits, tubers, bulbs, rhizomes as parts of plants. Germinated plants or young plants, which may be transplanted after germination or after emergence from the soil, are included herein. The term "seed" embraces seeds and plant propagules of all kinds including but not limited to true seeds, seed pieces, suckers, corms, bulbs, fruit, tubers, grains, cuttings, cut shoots and the like. In a preferred embodiment a seed is a true seed.

"Fungicidal" refers to the ability of a substance to decrease or inhibit growth of fungi.

The term "agriculturally acceptable amount of active" refers to an amount of an active that kills or inhibits the plant disease for which control is desired, in an amount not significantly toxic to the plant being treated.

To "control" or "controlling" fungus means to inhibit, and/or suppress the ability of fungus or a fungus-like pathogen to grow and/or reproduce, or to limit fungus- and fungus-like pathogen-related damage or loss in crop plants or denotes control and prevention of a disease. Controlling effects include all deviation from natural development, for example: killing, retardation, decrease of the disease.

The term "agriculturally acceptable amount of active" refers to an amount of an active that kills or inhibits the plant disease for which control is desired, in an amount not significantly toxic to the plant being treated.

The term "locus" as used herein shall denote the vicinity of a desired crop in which control of the spread of phytopathogenic fungi or fungus-like pathogen is desired. The locus includes the vicinity of desired crop plants wherein the phytopathogenic fungi or fungus-like pathogen infection has either emerged or is most likely to emerge or is yet to emerge.

According to the present disclosure, "increased yield" of an agricultural plant means that the yield of a product of the respective plant is increased by a measurable amount over the yield of the same product of the plant produced under the same conditions, but without the application of the compositions described herein.

As described herein, a "fungicidally effective amount" is an amount of active ingredient such as a fungicide which causes an adversely modifying effect and includes deviations from natural development, killing, regulation, desiccation, retardation, and the like, of fungi and fungus-like pathogens.

Each of the aspects described above may have one or more embodiments.

Each of the embodiments described hereinafter may apply to one or all of the aspects described hereinabove. These embodiments are intended to be read as being preferred features of one or all of the aspects described hereinabove. Each of the embodiments described hereinafter applies to each of the aspects described hereinabove individually.

According to the present disclosure, it is preferred that the crop yield be increased by at least 0.5%, preferred at least 2%, more preferred at least 5%, upon application of the combinations and compositions described herein. Accordingly, there is provided a fungicidal composition useful in combating fungal and fungus-like pathogen infection, and which exhibits remarkable fungicidal activities against pathogenic fungi and fungus-like pathogens, particularly *Aphanomyces*. The composition also increases the vigour/yield of the plant. Surprisingly, the problems explained above are in part or in whole solved by the combination of the active compounds and/or methods as defined herein.

The present inventors have unexpectedly found that the application of the present fungicidal combination results in a significant enhancement in the crop plant health, crop yield as well as in the reduction of root rot infection caused by *Aphanomyces* and other phytopathogenic fungi and fungus-like pathogens, specifically in legume crop plants. The improvement in crop health and reduction in root rot infection has been brought about by applying the present composition comprising one or more triazole fungicides, one or more acylalanine fungicides, and one or more succinate dehydrogenase inhibitors (SDHI), thereby, controlling phytopathogenic fungi and fungus-like pathogens, particularly *Aphanomyces* spp., in legume crop plants.

It was observed and defined by the present inventors in terms of plant growth parameters that the application of the present composition resulted in the reduction of root rot infection caused by *Aphanomyces* and by *Asocochyta* blight and helped in the maintenance of plant health, thus proving the efficient and the broad-spectrum fungicidal use of the present composition against phytopathogenic fungi and fungus-like pathogens. Thus, the present invention confers an improved and efficient treatment to solve challenges encountered in cultivating leguminous crops.

In a preferred embodiment, a synergistic fungicidal combination for controlling phytopathogenic fungi and fungi like pathogens comprises
(a) a triazole fungicide,
(b) an acylalanine fungicide, and
(c) a succinate dehydrogenase inhibitor (SDHI).

In accordance with the aforesaid embodiment, the triazole fungicide is one or more of ipconazole, azaconazole, bitertanol, bromuconazole, cyproconazole, difenoconazole, diniconazole, epoxiconazole, etaconazole, fenbuconazole, fluquinconazole, flusilazole, flutriafol hexaconazole, imibenconazole, mefentrifluconazole, metconazole, myclobutanil, penconazole, propiconazole, simeconazole, tebuconazole, tetraconazole, triadimefon, triadimenol, triticonazole, and prothioconazole, and salts thereof.

In one embodiment, the triazole fungicide is ipconazole or a salt thereof.

In one embodiment, the triazole fungicide is cyproconazole.

In one embodiment, the triazole fungicide is difenoconazole.

In one embodiment, the triazole fungicide is epoxiconazole.

In one embodiment, the triazole fungicide is hexaconazole.

In one embodiment, the triazole fungicide is tebuconazole.

In one embodiment, the triazole fungicide is prothioconazole.

According to one embodiment, the acylalanine fungicide is one or more of metalaxyl, metalaxyl M, benalaxyl, benalaxyl-M or furalaxyl or salts thereof, preferably metalaxyl or a salt or an isomer thereof.

In an embodiment, the acylalanine fungicide is metalaxyl-M.

According to one embodiment, the succinate dehydrogenase inhibitors (SDHI) fungicide is one or more of fenfuram, benodanil, boscalid carboxin, fenfuram, isofetamid, flutolanil furametpyr, mepronil, oxycarboxin, penthiopyrad, thifluzamide, benzovindiflupyr, bixafen, fluindapyr, fluxapyroxad, inpyrfluxam, isopyrazam, penflufen, sedaxane, isoflucypram, pydiflumetofen.

In an embodiment, the carboxamide fungicide is boscalid.

In an embodiment, the carboxamide fungicide is carboxin.

In an embodiment, the carboxamide fungicide is oxycarboxin.

In an embodiment, the carboxamide fungicide is penthiopyrad.

In an embodiment, the carboxamide fungicide is thifluzamide.

In an embodiment, the carboxamide fungicide is flutolanil.

In a preferred embodiment, a fungicidal combination for controlling phytopathogenic fungi and fungus-like pathogens comprises;
(a) ipconazole, or a salt thereof,
(b) metalaxyl, or a salt or an isomer thereof, and
(c) carboxin.

In an embodiment, the components of the present fungicidal combination comprising ipconazole, metalaxyl and carboxin are admixed in a ratio of (1-80):(1-80):(1-80), respectively. More preferably, the present fungicidal combination comprises ipconazole, metalaxyl and carboxin in the ratio of (1-40):(1-40):(1-40). Most preferably, the present fungicidal combination comprises ipconazole, metalaxyl and carboxin in the ratio of (1-20):(1-20):(1-20).

In a preferred embodiment, the present fungicidal combination comprising ipconazole, metalaxyl and carboxin are admixed in a ratio of (1-5):(1-10):(1-40), respectively.

In a most preferred embodiment, the present fungicidal combination comprising ipconazole, metalaxyl and carboxin are admixed in a ratio of 1:3:27, respectively.

In an embodiment the present disclosure provides a fungicidal combination for controlling root rot disease in crop plants caused by phytopathogenic fungi and fungus-like pathogens, preferably *Asocochyta* and fungus-like pathogens, preferably *Aphanomyces* sp. Accordingly, the present fungicidal combination can be used to control fungal diseases from one or more species of: *Alternaria alternata, Aphanomyces euteiches* f. sp. *pisi, Ascochyta pinodella, Ascochyta pinodes, Ascochyta pisi, Botryotinia fuckeliana, Botrytis cinerea, Cercospora pisa-sativae, Chalara elegans, Cladosporium cladosporioides* f. sp. *pisicoia, Cladosporium pisicoia, Colletotrichum gloeosporioides, Colletotrichum pisi, Erysiphe pisi, Fusarium oxysporum, Fusarium oxysporum.* sp. *pisi, Fusarium solani, Fusicladium pisicoia, Glomerella cingulata, Mycosphaerella pinodes, Oidium* sp., *Peronospora viciae, Phoma pinodella, Pythium* spp.,

*Rhizoctonia solani, Sclerotinia sclerotiorum, Septoria pisi, Thanatephonis cucumeris, Thielaviopsis hasicola* and *Uromyces fabae*, Soybean diseases: *Cercospora kikuchii, Elsinoe glycines, Diaporthe phaseolorum* var. *sojae, Septoria glycines Cercospora* sojina, *Phakopsora pachyrhizi, Cochliobolus sativus, Phomopsis longicolla* (soybean), *Phytophthora sojae* and *Rhizoctonia solani*, and combinations thereof.

In an embodiment, a fungicidal combination comprises ipconazole, metalaxyl and carboxin as active components, for controlling root rot disease caused by phytopathogenic fungi and fungus-like pathogens, preferably *Asocochyta* and fungus-like pathogens, preferably *Aphanomyces* sp.

In an embodiment, a fungicidal combination comprises ipconazole, metalaxyl and carboxin as active components suppresses and/or treats root rot disease caused by *Aphanomyces* fungus-like pathogens in leguminous crop plants, preferably, pea, alfalfa, beans, and clovers.

In an embodiment, a fungicidal combination comprises ipconazole, metalaxyl and carboxin as active components to suppresses and/or treats root rot disease caused by *Asocochyta* fungus in leguminous crop plants, preferably, pea, alfalfa, beans, and clovers.

In an embodiment, a fungicidal combination comprises ipconazole, metalaxyl and carboxin as active components maintains and improves health in crop plants which are susceptible to infection by *Asocochyta* sp. and *Aphanomyces* sp.

In an embodiment, a fungicidal combination comprises ipconazole, metalaxyl and carboxin as active components maintains and improves plant health in leguminous crop plants, preferably, pea, alfalfa, beans, and clovers which are susceptible to *Aphanomyces* infection.

In an embodiment, a fungicidal combination comprises ipconazole, metalaxyl and carboxin as active components maintains and improves plant health in leguminous crop plants, preferably, pea, alfalfa, beans, and clovers which are susceptible to *Asocochyta* fungus.

In a preferred embodiment, a fungicidal composition for controlling phytopathogenic fungi and fungi like pathogens comprises (a) a triazole fungicide, (b) an acylalanine fungicide, and (c) a succinate dehydrogenase inhibitor (SDHI) fungicide.

In accordance with the aforesaid embodiment, the triazole fungicide is one or more of ipconazole, azaconazole, bitertanol, bromuconazole, cyproconazole, difenoconazole, diniconazole, epoxiconazole, etaconazole, fenbuconazole, fluquinconazole, flusilazole, flutriafol hexaconazole, imibenconazole, mefentrifluconazole, metconazole, myclobutanil, penconazole, propiconazole, simeconazole, tebuconazole, tetraconazole, triadimefon, triadimenol, triticonazole, and prothioconazole, or salts thereof.

In one embodiment, the triazole fungicide is preferably ipconazole or a salt thereof.

According to one embodiment, the acylalanine fungicide is one or more of metalaxyl, metalaxyl M, benalaxyl, benalaxyl-M and furalaxyl or salts thereof.

In one embodiment, the acylalanine fungicide is metalaxyl or a salt or an isomer thereof.

According to one embodiment, the succinate dehydrogenase inhibitor (SDHI) is an oxathiin-carboxamide, wherein the said oxathiin-carboxamide is carboxin or oxycarboxin, preferably carboxin.

In a preferred embodiment, a fungicidal composition for controlling phytopathogenic fungi and fungi like pathogens comprises (a) ipconazole, or a salt thereof, (b) metalaxyl, or a salt or an isomer thereof, and (c) carboxin.

In an embodiment, a fungicidal composition comprises ipconazole in a concentration ranging from about 0.1 wt % to 20 wt %, metalaxyl in a concentration ranging from about 1 wt % to 50 wt %, and carboxin in a concentration ranging from about 5% wt % to 60 wt %, each based on the total weight of the composition.

More preferably, a fungicidal composition comprises ipconazole in a concentration ranging from about 0.1 wt % to 10 wt %, metalaxyl in a concentration ranging from about 1.0 wt % to 20 wt %, and carboxin in a concentration ranging from about 10% wt % to 30 wt %, each based on the total weight of the composition.

Most preferably, a fungicidal composition comprises ipconazole in a concentration ranging from about 0.1 wt % to 3 wt %, metalaxyl in a concentration ranging from about 1.0 wt % to 5.0 wt %, and carboxin in a concentration ranging from about 10 wt % to 15 wt %, each based on the total weight of the composition.

In one preferred embodiment, a fungicidal composition comprises:

(a) ipconazole in a concentration of 0.5 wt % of the total weight of the composition, (b) metalaxyl in a concentration of 1.5 wt % of the total weight of the composition, and (c) carboxin in a concentration of 13% wt % of the total weight of the composition.

In an embodiment, the components of the present fungicidal composition comprising ipconazole, metalaxyl and carboxin are admixed in a ratio of (1-80):(1-80):(1-80), respectively.

More preferably, ipconazole, metalaxyl and carboxin are admixed in the ratio of (1-40):(1-40):(1-40), respectively.

Most preferably, ipconazole, metalaxyl and carboxin are admixed in the ratio of (1-20):(1-20):(1-20), respectively.

In a preferred embodiment, the present fungicidal composition comprising ipconazole, metalaxyl and carboxin are admixed in a ratio of (1-5):(1-15):(20:40), respectively.

In an embodiment, the present disclosure provides a fungicidal composition for controlling root rot disease in crop plants caused by phytopathogenic fungi, preferably *Asocochyta* and fungus-like pathogens, preferably *Aphanomyces* sp.

In an embodiment the present disclosure provides a fungicidal composition comprising ipconazole, metalaxyl and carboxin as active components, for controlling root rot disease caused by phytopathogenic fungi and fungus-like pathogens, preferably *Asocochyta* and fungus-like pathogens, preferably *Aphanomyces* sp.

In an embodiment, the present disclosure provides a fungicidal composition comprising ipconazole, metalaxyl and carboxin as active components, to suppress and/or treat root rot disease caused by *Aphanomyces* fungus-like pathogen in leguminous crop plants, preferably, pea, alfalfa, beans, and clovers.

In an embodiment, the present disclosure provides a fungicidal composition comprising ipconazole, metalaxyl and carboxin as active components, to suppress and/or treat root rot disease caused by *Asocochyta* fungus in leguminous crop plants, preferably, pea, alfalfa, beans, and clovers.

In an embodiment, the present disclosure provides a fungicidal composition comprising ipconazole, metalaxyl and carboxin as active components, to maintain and improve health in crop plants which are susceptible to infection by *Asocochyta* sp and *Aphanomyces* sp.

In an embodiment, the present disclosure provides a fungicidal composition comprising ipconazole, metalaxyl and carboxin as active components, to maintain and improve plant health in leguminous crop plants, preferably, pea, alfalfa, beans, and clovers which are susceptible to *Aphanomyces* infection.

In an embodiment, the present disclosure provides a fungicidal composition comprising ipconazole, metalaxyl and carboxin as active components, to maintain and improve plant health in leguminous crop plants, preferably, pea, alfalfa, beans, and clovers which are susceptible to *Asocochyta* fungus.

Preferably, the fungicidal composition comprising ipconazole, metalaxyl and carboxin as active components, is used to prevent and/or treat root rot disease caused by *Aphanomyces* fungus.

In an embodiment, the present disclosure provides a composition for treatment of a plant propagation material, comprising ipconazole, metalaxyl and carboxin optionally with at least one agrochemically acceptable carrier.

In an embodiment, provided herein is a seed treatment composition for controlling root rot disease caused by *Rhizoctonia solani, Fusarium* spp., *Cochliobolus sativus, Aspergillus* spp. and *Penicillium* spp. *Pythium* spp. *Ascochyta* sp. *Phomopsis longicolla* (soybean), and/or *Aphanomyces euteiches*

In an embodiment, the plants are leguminous crops or cereal crops.

In an embodiment, the plants are pea or soybean plants.

In an embodiment, included is a method for controlling *Aphanomyces* fungus in a plant and/or improving the health of a plant, wherein the plant is treated with a composition comprising ipconazole, metalaxyl and carboxin in an effective amount.

In an embodiment, the method of controlling root rot caused by *Aphanomyces euteiches* in, particular by seed treatment, comprises applying a composition comprising ipconazole, metalaxyl and carboxin in an effective amount.

The total amount of ipconazole, carboxin and metalaxyl in the composition of the present disclosure is in the range of about 0.1 to 99 wt %, preferably 0.5 to 90 wt %, further preferably 1 to 80 wt %.

In an embodiment, the total amount of ipconazole in the composition may be present in the range of 0.1 to 99% by weight. The total amount of carboxin in the composition may be present in the range of 0.1 to 99% by weight. The total amount of metalaxyl in the composition may be present in the range of 0.1 to 99% by weight.

In an embodiment, the total amount of ipconazole in the composition may be present in the range of 0.1% to 20% by weight. The total amount of carboxin in the composition may be present in the range of 5% to 60% by weight. The total amount of metalaxyl in the composition may be present in the range of 1% to 50% by weight.

In one preferred embodiment, the fungicidal composition comprises:
    (a) ipconazole in a concentration of 0.5 wt % of the total weight of the composition,
    (b) metalaxyl in a concentration of 1.5 wt % of the total weight of the composition, and
    (c) carboxin in a concentration of 13% wt % of the total weight of the composition.

In an embodiment, the target crop may include cereals such as wheat, barley, rye, oats, corn, rice, sorghum, triticale and related crops; beets such as sugar beet and fodder beet; leguminous plants such as beans, lentils, peas, soybean, chickpeas; dry bean, dry pea, rye, triticale, oat, wheat, barley, oil plants such as rape, mustard, sunflowers; cucurbits such as marrows, cucumbers, melons; fibre plants such as cotton, flax, hemp, jute; vegetables such spinach, lettuce, asparagus, cabbages, carrots, onions, tomatoes, potatoes, paprika as well as ornamentals such as flowers, shrubs, broad-leaved trees and evergreens, such as conifers.

In an embodiment the present seed treatment composition can be used to control fungal diseases, for example pea diseases caused by one or more species of: *Alternaria alternata, Aphanomyces euteiches* f. sp. *pisi, Ascochyta pinodella, Ascochyta pinodes, Ascochyta pisi, Botryotinia fuckeliana, Botrytis cinerea, Cercospora pisa-sativac, Chalara elegans, Cladosporium cladosporioides* f. sp. *pisicoia, Cladosporium pisicoia, Colletotrichum glocosporioides, Colletotrichum pisi, Erysiphe pisi, Fusarium oxysporum, Fusarium oxysporum.* sp. *pisi, Fusarium solani, Fusicladium pisicoia, Glomerella cingulata, Mycosphaerella pinodes, Oidium* sp., *Peronospora viciae, Phoma pinodella, Pythium* spp., *Rhizoctonia solani, Sclerotinia sclerotiorum, Septoria pisi, Thanatephonis cucumeris, Thielaviopsis hasicola* and *Uromyces fabae,* Soybean diseases: *Cercospora kikuchii, Elsinoe glycines, Diaporthe phaseolorum* var. *sojae, Septoria glycines, Cercospora sojina, Phakopsora pachyrhizi, Phytophthora sojae,* and *Rhizoctonia solani.*

In one embodiment, the present compositions are used for controlling *Aphanomyces euteiches.*

In an embodiment, the target crop is leguminous crops or cereal crops.

In an embodiment, the target crop is field pea or lentil.

In an embodiment, the target crop is beans.

In an embodiment, the target crop is soybean.

In an embodiment, the target pathogen and disease are caused by *Aphanomyces* species.

In an embodiment, the target pathogen and disease are root rot caused by *Aphanomyces euteiches.*

In an embodiment, the target disease for pea is root rot caused by *Aphanomyces* species, specifically *Aphanomyces euteiches.*

In another embodiment the secondary pathogens they may be targeted include seed rot (*Penicillium* spp. and *Aspergillus* spp.) damping off and seedling diseases, seedling blight (*Rhizoctonia solani, Fusarium* spp., *Pythium* spp.), seedling root rot (*Rhizoctonia solani*), seed rot and damping off caused by *Pythium,* root rot caused by Rhizoctonin, *Fusarium,* and *Botrytis,* seed rot and damping off caused by *Pythium,* root rot caused by and *Rhizoctonia,* and seed borne *ascochyta* blight. Typically, the compositions of present disclosure provide for the control or suppression of seed, seedling and soil-borne diseases of cereal grains (barley, wheat, oat, rye and triticale), dried shelled pea and bean (dry pea, dry bean, lentil and chickpea) and soybean.

In a preferred embodiment, the present disclosure provides the use of said compositions for controlling diseases in leguminous crops caused by *Aphanomyces* fungus-like pathogen.

Typically, the present disclosure provides use of present compositions for controlling root rot disease caused by *Aphanomyces euteiches* in pea crop.

The present compositions may comprise ipconazole, carboxin and metalaxyl as active components and at least one agrochemically excipient/carrier.

In an embodiment the present compositions are used for seed treatment of plants. In the treatment of seeds, the present formulations are commonly applied by treating the seeds with an effective amount of the compositions.

In the treatment of a seed, the application rates of the compositions of described herein formulated to provide ipconazole at 5 g a.i./L, metalaxyl at 13.33 g a.i./L and carboxin at 133.33 gai/L to provide a range from 0.001 to 1000 ml/100 kg seed, preferably 0.1 to 500 ml/100 kg of seeds. The amount of active ingredient based on application rates are generally in the range of 0.005 to 5 g a.i./100 kg of seed for ipconazole, 0.0133 to 13.33 gai/100 kg of seed for metalaxyl and 0.133 to 133.33 g ai/100 kg of seed for carboxin.

In an embodiment, the constituents of the composition of the present disclosure may be applied as per known methods of application to seeds and other plant propagation material or transplanted saplings.

In an embodiment, the compositions can be formulated into either solid or liquid formulations that are suitable for application to plant propagation material. The formulation may be made as known formulation types such as wettable powders (WP), solutions (LS), emulsions (ES), suspension concentrates (FS), water dispersible granules (WG), and aqueous suspension concentrates (CS).

The formulation may be applied by various methods such methods using conventional treating techniques and machines, such as fluidized bed techniques, the roller mill method, drones, rotostatic seed treaters, and drum coaters, spouted beds, etc. Pre- and post-coating procedures such as sizing etc., may also be carried out. Such procedures are known in the art. It is readily understood that plant propagation material will typically be treated only once it is removed from the plant and is ready to be re-sown.

In an embodiment, the treatment may occur before sowing of the plant propagation material so that the sown material has been pre-treated with the combination. In particular, seed coating or seed pelleting are preferred in the treatment of the combinations according to the disclosure. As a result of the treatment, the active ingredients in the combination are adhered on to the seed and therefore available for disease control. The formulations may be diluted in a carrier to not less than effective concentration.

The formulations may contain standard agriculturally acceptable adjuvants, carriers, diluents, emulsifiers, fillers, dispersing agents, anti-foaming agents, preservatives, thickening agents, anti-freezing agents, biocides, pigments, etc.

Exemplary agricultural adjuvants and carriers include, but are not limited to, crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; C9-C11 alkylpolyglycoside; phosphated alcohol ethoxylate; natural primary alcohol (C12-C16) ethoxylate; di-sec-butylphenol EO-PO block copolymer; polysiloxane-methyl cap; nonylphenol ethoxylate, urea ammonium nitrate; tridecyl alcohol (synthetic) ethoxylate (8EO); tallow amine ethoxylate; PEG(400) dioleate-99, alkyl sulfates, such as diethanolammonium lauryl sulfate; alkylarylsulfonate salts, such as calcium dodecylbenzenesulfonate; alkylphenol-alkylene oxide addition products, such as nonylphenol-Cis ethoxylate; alcohol-alkylene oxide addition products, such as tridecyl alcohol-Ci6 ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethyl-hexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

Exemplary liquid carriers that may be employed in a composition of the present disclosure include water and organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids, and the like.

Organic solvents include, but are not limited to, toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, and dimethyl sulfoxide.

Solid carriers that may be employed in the compositions of the present disclosure include, but are not limited to, attapulgite, pyrophyllite clay, silica, kaolin clay, kieselguhr, chalk, diatomaceous earth, lime, calcium carbonate, bentonite clay, Fuller's earth, talc, cottonseed hulls, wheat flour, soybean flour, pumice, wood flour, walnut shell flour, lignin, cellulose, etc.

Thickeners include silicates such metal silicates, sodium carboxymethyl cellulose, methyl cellulose, ethyl cellulose, polyvinylalcohol, sodium alginate, sodium poly acrylate, xanthan gum, welan gum, gum arabic, montmorillonite, lignosulfonates, hydroxy methyl cellulose, dextrin, starch, and mixtures thereof.

Anti-freezing agents include glycerin, ethylene glycol, propylene glycol, preferably propylene glycol and the like. Anti-foaming agents include silicone oils, mineral oils, fatty acid esters; biocides such as sodium benzoate, 1,2-benzisothiazoline-3-one, 2-methyl-4-isothiazolin-3-one, 5-chloro-2-methyl-4-isothiazolin-3-one, potassium sorbate, parahydroxy benzoates, and the like. Pigments may also be included in the formulation and include, but are not limited to, pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, violet 23, acid red 51, acid red 52, acid red 14, acid blue 9, acid yellow 23, basic red 10, and basic red 108. Polymers include polyvinyl alcohols, polyvinylpyrrolidone, gel-forming carrageenans, water-soluble gelatine and casein, superabsorbent polymers such polyacrylamides and polyacrylates based polymers, semi-synthetic or fully-synthetic peptide/protein-based superabsorbent polymers such as collagenbased synthetic polymers, elastin-like polypeptides, polyaspartic acid, polyaspartates, polyglutamic acid, polyglutamate, semi-synthetic or fully-synthetic polysaccharide: carboxymethyl starch, sulfoethyl starch, carboxymethyl cellulose, sulfoethyl cellulose, hydroxypropyl cellulose, hydroxyethyl cellulose, methylcellulose, chitosan; cross-linked polysaccharides such as CMS cross-linked with multi-functional carboxylic acids or multi-functional epoxides and the like.

Polysaccharide graft copolymers are polysaccharides obtained by graft polymerizing a monomer onto a polysaccharide, wherein the monomer is selected from acrylonitrile, acrylic acid, methacrylic acid, acrylamide, methacrylamide, 2-acrylamido-2-methyl-propanesulfonic acid (AMPS), vinyl sulfonic acid, ethyl acrylate, and potassium acrylate, and the like.

In an embodiment, the formulation is an FS (Flowable concentrate) formulation comprising a combination of ipconazole, carboxin and metalaxyl as active components and at least one agrochemically excipient/carrier.

In an embodiment, the present disclosure provides a process for preparation of composition comprising mixing ipconazole, carboxin and metalaxyl as active components and at least one agrochemically excipient/carrier, preferably at room temperature.

In a preferred embodiment, the present disclosure provides a method of controlling and/or suppressing the growth of phytopathogenic fungi and fungus-like pathogens in crop plants, said method comprising contacting or applying to seeds, foliage or at the locus of crop plants an effective amount of a fungicidal composition comprising, (a) a triazole fungicide, (b) an acylalanine fungicide, or a salt thereof, and (c) a succinate dehydrogenase inhibitor (SDHI) fungicide.

In a preferred embodiment, the present disclosure provides a method of controlling and/or suppressing the growth of phytopathogenic fungi and fungus-like pathogens in crop plants, said method comprising, contacting or applying to seeds, foliage or at the locus of crop plants an effective amount of a fungicidal composition comprising, (a) ipconazole or a salt thereof, (b) metalaxyl or a salt thereof, and (c) carboxin.

In an embodiment, the present disclosure provides a method of controlling and/or suppressing the growth of phytopathogenic fungi and fungus-like pathogens in crop plants, said method comprising contacting or applying an effective amount of a fungicidal composition comprising (a) ipconazole in a concentration ranging from about 0.1 wt % to 20 wt %, (b) metalaxyl in a concentration ranging from about 1 wt % to 50 wt %, and (c) carboxin in a concentration ranging from about 5% wt % to 60 wt %, each based on the total weight of the composition, to seeds, foliage or at the locus of crop plants.

More preferably, the present disclosure provides a method of controlling and/or suppressing the growth of phytopathogenic fungi and fungus-like pathogens in crop plants, said method comprising contacting or applying an effective amount of a fungicidal composition comprising (a) ipconazole in a concentration ranging from about 0.1 wt % to 10 wt %, (b) metalaxyl in a concentration ranging from about 1.0 wt % to 20 wt %, and (c) carboxin in a concentration ranging from about 10% wt % to 30 wt %, each based on the total weight of the composition, to seeds, foliage or at the locus of crop plants.

Most preferably, the present disclosure provides a method of controlling and/or suppressing the growth of phytopathogenic fungi and fungus-like pathogens in crop plants, said method comprising contacting or applying an effective amount of a fungicidal composition comprising (a) ipconazole in a concentration ranging from about 0.1 wt % to 3 wt %, (b) metalaxyl in a concentration ranging from about 1.0 wt % to 3 wt %, and (c) carboxin in a concentration ranging from about 10 wt % to 15 wt %, each based on the total weight of the composition, to seeds, foliage or at the locus of crop plants.

In one preferred embodiment, the present disclosure provides a method of controlling and/or suppressing the growth of phytopathogenic fungi and fungus-like pathogens in crop plants, said method comprising contacting or applying an effective amount of a fungicidal composition comprising (a) ipconazole in a concentration of 0.5 wt % of the total weight of the composition, (b) metalaxyl in a concentration of 1.5 wt % of the total weight of the composition, and (c) carboxin in a concentration of 13% wt % of the total weight of the composition, to seeds, foliage or at the locus of crop plants.

In an embodiment, the present disclosure provides a method of controlling and/or suppressing the growth of phytopathogenic fungi and fungus-like pathogens in crop plants, said method comprising, contacting or applying an effective amount of a fungicidal composition comprising; ipconazole, metalaxyl and carboxin are admixed in a ratio of (1-80):(1-80):(1-80), respectively to seeds, foliage or at the locus of crop plants. More preferably, ipconazole, metalaxyl and carboxin are applied in the ratio of (1-40):(1-40):(1-40), respectively to seeds, foliage or at the locus of crop plants. Most preferably, ipconazole, metalaxyl and carboxin are applied in the ratio of (1-20):(1-20):(1-20), respectively to seeds, foliage or at the locus of crop plants.

In a preferred embodiment, the present disclosure provides a method of controlling and/or suppressing the growth of phytopathogenic fungi and fungus-like pathogens in crop plants, said method comprising contacting or applying an effective amount of a fungicidal composition comprising ipconazole, metalaxyl and carboxin are admixed in a ratio of (1-5):(1-15):(20:40), respectively, to seeds, foliage or at the locus of crop plants.

Accordingly, in one more preferred embodiment, the present disclosure provides a method of controlling and/or suppressing the growth of *Aphanomyces* sp. in legume crop plants, said method comprising contacting or applying an effective amount of a fungicidal composition comprising (a) ipconazole, (b) metalaxyl, and (c) carboxin to seeds, foliage or at the locus of crop plants.

In one more preferred embodiment, the present disclosure provides a method of controlling and/or suppressing the growth of *Ascochyta* sp. in legume crop plants, said method comprising, contacting or applying an effective amount of a fungicidal composition comprising (a) ipconazole, (b) metalaxyl, and (c) carboxin to seeds, foliage or at the locus of crop plants.

In an embodiment, the present disclosure provides a method of controlling and/or suppressing the growth of phytopathogenic fungi and fungus-like pathogens, wherein the rate of application of the fungicidal composition comprising (a) ipconazole, (b) metalaxyl, and (c) carboxin is in the range of 300 ml/100 kg to 600 ml/100 kg to seed or foliage in crop plants.

In an embodiment, the present disclosure provides a method of controlling and/or suppressing the growth of phytopathogenic fungi and fungus-like pathogens, wherein the rate of application of the fungicidal composition comprising (a) ipconazole, (b) metalaxyl, and (c) carboxin is 500 ml/100 kg to seed or foliage in crop plants.

In an embodiment, the present disclosure provides a method of controlling and/or suppressing the growth of phytopathogenic fungi and fungus-like pathogens, said method comprising contacting or applying an effective amount of a fungicidal composition comprising ipconazole, metalaxyl and carboxin, wherein the delivery rate of ipconazole is in the range of 0.5 g a.i/100 kg to 3 g a.i/100 kg; wherein the delivery rate of metalaxyl is in the range of 4 g a.i/100 kg to 8 g a.i/100 kg, and wherein the delivery rate of carboxin is in the range of 50 g a.i/100 kg to 70 g a.i/100 kg to seeds or foliage in crop plants.

In an embodiment, the present disclosure provides a method of controlling and/or suppressing the growth of phytopathogenic fungi and fungus-like pathogens, said method comprising contacting or applying an effective amount of a fungicidal composition comprising ipconazole, metalaxyl and carboxin, wherein the delivery rate of ipconazole is in the range of 1 g a.i/100 kg to 2.5 g a.i/100 kg; wherein the delivery rate of metalaxyl is in the range of 5 g a.i/100 kg to 7 g a.i/100 kg, and wherein the delivery rate of carboxin is in the range of 60 g a.i/100 kg to 70 g a.i/100 kg.

The preferred delivery rate of ipconazole is 2.5 g a.i/100 kg, delivery rate of metalaxyl is 6.7 g a.i/100 kg, and the delivery rate of carboxin is 66.7 g a.i/100 kg.

Accordingly, the phytopathogenic fungus is preferably *Asocochyta* and fungus-like pathogen, is preferably *Aphanomyces* sp. In an embodiment, the combination of the present disclosure may be used for treatment of plant propagation material of crops such as cereals such as wheat, barley, rye, oats, corn, rice, sorghum, triticale and related crops; beets such as sugar beet and fodder beet; leguminous plants such as beans, lentils, peas, soybean; oil plants such as rape, mustard, sunflowers; cucurbits such as marrows, cucumbers, melons; fibre plants such as cotton, flax, hemp, jute; vegetables such spinach, lettuce, asparagus, cabbages, carrots, onions, tomatoes, potatoes, paprika as well as ornamentals such as flowers, shrubs, broad-leaved trees and evergreens, such as conifers. The plant propagation material may also be used on varieties of plant propagation material such as conventional, hybrid or transgenic plants. In an embodiment, the combinations of the present invention may further contain herbicide, fungicides, insecticides, fertilizers, biologicals, other plant growth additives such as mycorrhiza, silicic acid, plant derived growth promoters, etc.

According to an embodiment of the present disclosure, the various components of the fungicidal composition can be used individually or already partially or completely mixed with one another to prepare the composition according to the invention. It is also possible for them to be packaged and used further as combination composition such as a kit of parts.

In another aspect, the compositions may be presented in the form of a multi-pack fungicidal product or as a kit-of-parts for controlling target fungi or fungus-like pathogens.

In an embodiment, the multi-pack herbicidal product comprises a package holding a composition comprising one or more containers containing fungicidally effective amounts of ipconazole, carboxin and metalaxyl, respectively, together with the instruction manual.

The multi-pack product described above is fungicidally efficacious for seed treatment.

The present combination demonstrated an enhanced root rot control in crops which resulted in increased yield.

An improvement in the root rot control is defined in terms of the % reduction in root rot infection in crops infected by phytopathogenic fungi or fungi like pathogens, wherein the % reduction in root rot infection is by at least 40% in seeds or crops treated with the composition or combinations described herein compared to the root rot infection in untreated seeds or crops.

An improvement in the crop yield is defined in terms of an increase in crop yield by at least 0.5%, preferred at least 5%, more preferred at least 10%, upon application of the combinations and compositions described herein.

The compositions according to the disclosure, for use in the present methods, can be applied before or after infection of the useful plants or the propagation material thereof by the fungi and/or fungus-like pathogens.

The method of the present disclosure also improves the existing disease control to an unexpectedly high degree and surprisingly improves the yield obtained. According to an embodiment, the method is for improving the health of a plant.

According to a further embodiment of the disclosure, by means of seed treatment the health of the plants that are growing from seed that has been treated with said present compositions is improved.

In a preferred embodiment, the present disclosure provides a method of improving and maintaining plant health in crops susceptible to infection phytopathogenic fungi and fungus-like pathogens, said method comprising contacting or applying an effective amount of a fungicidal composition comprising (a) a triazole fungicide, (b) an acylalanine fungicide or a salt thereof, and (c) a succinate dehydrogenase inhibitor (SDHI) fungicide, to seeds, foliage or at the locus of crop plants.

In a preferred embodiment, the present disclosure provides a method of improving and maintaining plant health in crops susceptible to infection phytopathogenic fungi and fungus-like pathogens, said method comprising contacting or applying an effective amount of a fungicidal composition comprising (a) ipconazole, a salt or derivative thereof, (b) metalaxyl, a salt or derivative thereof, and (c) carboxin, to seeds, foliage or at the locus of crop plants.

In an embodiment, the present disclosure provides a method of improving and maintaining plant health in crops susceptible to infection phytopathogenic fungi and fungus-like pathogens, said method comprising contacting or applying an effective amount of a fungicidal composition comprising:

(a) ipconazole in a concentration ranging from about 0.1 wt % to 20 wt %, (b) metalaxyl in a concentration ranging from about 1 wt % to 50 wt % and (c) carboxin in a concentration ranging from about 5% wt % to 60 wt %, each based on the total weight of the composition, to seeds, foliage or at the locus of crop plants.

In one preferred embodiment, the present disclosure provides a method of improving and maintaining plant health in crops susceptible to infection phytopathogenic fungi and fungus-like pathogens, said method comprising contacting or applying an effective amount of a fungicidal composition comprising:

(a) ipconazole in a concentration of 0.5 wt % of the total weight of the composition, (b) metalaxyl in a concentration of 1.5 wt % of the total weight of the composition, and (c) carboxin in a concentration of 13% wt % of the total weight of the composition, each based on the total weight of the composition, to seeds, foliage or at the locus of crop plants.

In a preferred embodiment, the present disclosure provides a method of improving and maintaining plant health in crops susceptible to infection phytopathogenic fungi and fungus-like pathogens, said method comprising contacting or applying an effective amount of a fungicidal composition comprising ipconazole, metalaxyl and carboxin are admixed in a ratio of (1-5):(1-15):(20-40), respectively, to seeds, foliage or at the locus of crop plants.

In an embodiment, the present disclosure provides the present invention provides a method of improving and maintaining plant health in crops susceptible to infection by phytopathogenic fungi and fungus-like pathogens, said method comprising contacting or applying an effective amount of a fungicidal composition comprising ipconazole, metalaxyl and carboxin, wherein the rate of application of the fungicidal composition comprising (a) ipconazole, (b) metalaxyl, and (c) carboxin is in the range of 300 ml/100 kg to 600 ml/100 kg to seed or foliage in crop plants.

For the purposes of the present invention, the term improved plant health is defined as the ability of the plant to maintain survival and its growth under stressed conditions, including the presence by phytopathogenic organisms. Accordingly, improved plant health is measured in terms of a percentage increase in seed emergence, plant height, shoot presence, root weight accompanied with a percentage reduction in seed mortality and infection and other such parameters that indicate the health of the plant.

In one embodiment, the leguminous crop is one or more from field pea, lentil, Soybean, dried shelled pea, and bean.

In an embodiment, the present invention provides a method of improving and maintaining plant health in crops susceptible to infection phytopathogenic fungi and fungus-like pathogens, said method comprising contacting or applying an effective amount of a fungicidal composition comprising ipconazole, metalaxyl and carboxin to seeds or foliage, wherein the delivery rate of ipconazole is in the range of 0.5 g a.i/100 kg to 3 g a.i/100 kg; wherein the delivery rate of metalaxyl is in the range of 4 g a.i/100 kg to 8 g a.i/100 kg, and wherein the delivery rate of carboxin is in the range of 50 g a.i/100 kg to 70 g a.i/100 kg.

According to one embodiment of the present disclosure, the yield of an agricultural plant is increased. Effectively, the composition of present disclosure displayed improvement of the plant defense mechanism against targeted pathogens. It promoted the growth of the seedlings through the increment of the root system, with greater depth of roots and better utilization of nutrients. Increased photosynthetic, consequently lower energy consumption of the seedling providing vigorous growth, conditioning the plant to achieve superior productivity even under stress conditions.

While the foregoing written description of the invention enables one of ordinary skill to make and use what is considered presently to be the best mode thereof, those of ordinary skill will understand and appreciate the existence of variations, its combinations, and equivalents of the specific embodiment, method, and examples herein. The invention should therefore not be limited by the above described embodiment, method, and examples, but by all embodiments and methods within the scope and spirit of the invention.

The invention will be illustrated with reference to the following examples.

EXAMPLES

Example 1

Trials were conducted to test the effects of present composition in treated and untreated pea crop against *Aphanomyces* infection. Treatments 1 and 2, each included a composition comprising ipconazole, metalaxyl and carboxin for control of root rot in peas, which was applied to seeds at different rates for both the treatments. There was no chemical phytotoxicity observed from the seed treatments. Results are presented in below table.

TABLE 1

| Treatments | Conc. g/L | Rate/Rate unit | Root rot infection (%) | Yield (bu/acre) |
|---|---|---|---|---|
| Untreated | — | — | 90% | 26 |
| Treatment 1 | Ipconazole at 5.0 gai/L, Carboxin at | 300 ml/100 kg | 50% | 32 |
| Treatment 2 | 133.3 gai/L Metalaxyl at 13.3 gai/L | 400 ml/100 kg | 48.3% | 33 |

It was observed from the above data that the present compositions have significantly reduced the infection caused by *Aphanomyces* fungus in peas compared to the untreated pea seeds. In an aspect, the compositions described herein reduce root rot infection by at least 40% compared to untreated seeds.

Example 2: Potted Plant Trial at 2× Rate of *Aphanomyces* Infection

Experiment Procedure

In a potted plant trial, treated field pea seeds (*Pisum sativum*) in vermiculite were inoculated with *Aphanomyces euteiches* zoospore suspension and the efficacy of the present composition (Treatment no. 5) as described in table 2 below was evaluated by observing the infection and rating the disease severity on roots. The control consisted of seed inoculated with *Aphanomyces* and used water as the seed treatment. The experiment was performed in a controlled environment growth cabinet.

TABLE 2

TREATMENT OF SEEDS SUBJECTED TO APHANOMYCES INFECTION (2X)

| No. | Treatment name | Conc. (g/l) | Rate of application g · ai/100 kg | Application amount (ml/100 kg) |
|---|---|---|---|---|
| 1. | No seed treatment, inoculated | 0 | 0 | 0 |
| 2. | Ipconazole | 450 | 2.5 g · ai/100 kg | 520 ml/100 kg |
| 3. | Carboxin | 400 | 66.7 g · ai/100 kg | |
| 4. | Metalaxyl | 317 | 6.7 g · ai/100 kg | |
| 5. | Ipconazole + Carboxin + Metalaxyl | Ipconazole at 5.0 gai/L, Carboxin at 133.3 gai/L Metalaxyl at 13.3 gai/L | 500 ml/100 kg | |

Note:

(delivery rate of individual components in the composition is Ipconazole: 2.5 g · ai/100 kg of seed, Carboxin: 66.7 g · ai/100 kg of seed, Metalaxyl: 6.7 g · ai/100 kg of seed.

Culture: A 3-day old culture of *Aphanomyces euteiches* (3 days is when growth has fully encompassed plate) was used for 5 mm inoculation plug source (each plate received one 5 mm plug and four seeds)×4 reps.

Experimental design: 4 reps of each treatment (including controls), with each replication represented by 5 planted seeds for a total of 20 seeds per treatment were performed. All treatments received inoculum. Each seed is placed in a solitary location of a plant tray/flat that has 50 plugs per flat. One flat contained 2 treatments, separated by 10 plugs (2 rows of 5). Treatments 1 and 6 (controls) shared the same flat. The plug flats were placed in a collection tray that was not perforated and all watering was done with tap water from bottom up. Tray lids remained on for the entire duration of the experiment, so the media surface did not dry out.

Culture media: 3 day old cultures of A. *euteiches* were grown on CYP (corn meal agar+yeast extract+phosphate buffer), amended with wheat leaf sections were transferred to 100 ml sterile distilled water in 250 ml flasks and shaken at 100 rpm in the dark at 23° C. for 18 hours for zoospore production.

Inducing *Aphanomyces* infection: Zoospores were counted and adjusted to a concentration of $1×10^4$ spores, and 5 mls of this suspension was pipetted to the base of each plant on 4 DAP and again on 11 DAP (days after planting). This amounted to 50000 zoospores applied to the base of each plant at each inoculation timing. This was called 2× rate. The experiment was conducted in a growth cabinet at 23° C./22° C., 16 hrs light/8 hours dak.-root washing/rating of root darkening took place at 29 DAP which was 18 days after the second inoculation event or 25 days after the first inoculation event.

Observed Results

For the aforementioned potted trials, wherein the pea crop was subjected to *Aphanomyces euteiches* infection at a 2× rate, the results have been observed in terms of % root rot damage, % stem damage, emergence of seed and plant height at an interval of 29 DAA (i.e., 29 Days after application). The results have been detailed herein below:

TABLE 3

PLANT GROWTH PARAMETERS AT 2X RATE APHANOMYCES INFECTION

| No. | Treatment name | Root rot damage* | Seed emergence (%) | Plant height (cm) |
|---|---|---|---|---|
| 1. | Untreated/water | 1.1 ab | 90.0 | 9.9 |
| 2. | Ipconazole | 2.2 a | 85.0 | 12.3 |
| 3. | Carboxin | 0.6 bc | 80.0 | 12.9 |
| 4. | Metalaxyl | 0.7 bc | 80.0 | 12.2 |
| 5. | Ipconazole + Carboxin + Metalaxy | 0.1 d | 95.0 | 12.5 |

*the rating unit is measured on a scale of 0 to 5 (0-5 index/scale)

** the rating unit for stem damage is measured on a scale of 0 to 3 (0-3 index/scale)

Means followed by same letter or symbol do not significantly differ (P = .05, Student-Newman-Keuls)

The seeds treated with the present composition provide for a significant reduction in root rot damage caused by *Aphanomyces* infection (2×) compared to the individual treatments. Further, % seed emergence in seeds treated with the present composition (treatment no. 5) was greater compared to individual treatment. Similarly, stem damage was considerably reduced, accompanied with good plant height. These observations were made almost a month after the application of the present composition, thus indicating the sustained and effective control of *Aphanomyces euteiches* in pea crop. In an aspect, the combination of ipconazole, carboxin and metalaxyl (treatment no. 5) provided a decrease in root rot damage of at least 0.5 on a 0-5 scale compared to any one active; an increase in seed emergence of at least 10% compared to any one active.

Efficacy of the Present Composition Against Fungal Pathogens

The present composition also demonstrates phytopathogenic activity against seed borne root rot with respect to reduction in stem damage caused by *Mycosphaerella pinodes* and *Ascochyta pinodella*, which is the causal agent of *ascochyta* blight on pea plants. This disease is found in all pea-producing areas of the world and can cause up to 75% yield loss and is caused by a complex of three fungi—*Ascochyta pisi, Mycosphaerella pinodes,* and *Phoma pinodella* The experiment was performed as per the procedure discussed in part A of this Example.

for 5 mm inoculation plug source (each plate received one 5 mm plug and four seeds)×4 reps.

Experimental design: 4 reps of each treatment, with each replication represented by 5 planted seeds for a total of 20 seeds per treatment were performed. All treatments received inoculum. Each seed is placed in a solitary location of a plant tray/flat that has 50 plugs per flat. One flat contained 2 treatments, separated by 10 plugs (2 rows of 5). Treatments 1 and 8 (controls) shared the same flat. The plug flats were placed in a collection tray that was not perforated and all watering was done with tap water from bottom up. Tray lids remained on for the entire duration of the experiment, so the media surface did not dry out.

TABLE 4

TREATMENT OF SEEDS SUBJECTED TO APHANOMYCES INFECTION

| No. | Treatment name | Conc. (g/l) | Rate of application | Result: Stem damage** |
|---|---|---|---|---|
| 1. | Untreated/water | 0 | 0 | 1.9 a |
| 2. | Ipconazole | 450 | 2.5 g · ai/100 kg | 0.9 ab |
| 3. | Carboxin | 400 | 66.7 g · ai/100 kg | 1.8 a |
| 4. | Metalaxyl | 317 | 6.7 g · ai/100 kg | 1.9a |
| 5. | Ipconazole + Carboxin + Metalaxyl | Ipconazole at 5.0 gai/L, Carboxin at 133.3 gai/L Metalaxyl at 13.3 gai/L | 500 ml/100 kg | 0.4b |

**the rating unit for stem damage is measured on a scale of 0 to 3 (0-3 index/scale)
Means followed by same letter or symbol do not significantly differ (P = .05, Student-Newman-Keuls)

In an aspect, the combination of ipconazole, carboxin and metalaxyl (treatment no. 5) provided a decrease in stem damage of at least 0.4 on a 0-5 scale compared to any one active.

Example 3: Potted Plant Trial at 1× Rate of *Aphanomyces* Infection

Experiment Procedure

In a potted plant trial, treated field pea seeds (*Pisum sativum*) in vermiculite were inoculated with *Aphanomyces euteiches* zoospore suspension and the efficacy of the present composition was evaluated by observing the infection and rating the disease severity on roots. A control using water was employed as the seed treatment that is inoculated and a control using water as the seed treatment that is not inoculated was also used. The experiment was performed in a controlled environment growth cabinet.

Culture: A 3-day old culture of *Aphanomyces euteiches* (3 days is when growth has fully encompassed plate) was used Culture media: 3 day old cultures of A. *euteiches* were grown on CYP (corn meal agar+yeast extract+phosphate buffer), amended with wheat leaf sections were transferred to 100 ml sterile distilled water in 250 ml flasks and shaken at 100 rpm in the dark at 23° C. for 18 hours for zoospore production.

Inducing *Aphanomyces* infection: Zoospores were counted and adjusted to a concentration of $5 \times 10^3$, and 5 ml of the suspension was pipetted to the base of each plant on 4 DAP and again on 11 DAP (days after planting). This amounted to 25000 zoospores applied to the base of each plant at each inoculation timing. This was called 1× rate *Aphanomyces* infection.

Observed Results

TABLE 5

TREATMENT COMPOSITION & OBSERVED PLANT GROWTH PARAMETERS AT 1X RATE APHANOMYCES INFECTION

| | | | | Observed results | | |
|---|---|---|---|---|---|---|
| No. | Treatment name | Conc. (g/l) | Rate of application ml/100 kg | Root rot damage* | Seed emergence (%) | Plant height (cm) |
| 1. | Ipconazole + Carboxin + Metalaxyl | Ipconazole at 5.0 gai/L, Carboxin at 133.3 gai/L Metalaxyl at 13.3 gai/L | 500 | 0.3 | 90 | 12.9 |

*the rating unit is measured on a scale of 0 to 5 (0-5 index/scale)

The method of the present invention resulted in an efficient control of damage in root caused by *Aphanomyces euteiches* accompanied with efficient plant health in terms of seed emergence and plant height in field pea crop.

Example 4: Petri Dish Trial

Experiment Procedure

Experimental design: 4 petri-dishes/reps with one 5 mm inoculation plug of *Aphanomyces euteiches* positioned in the center of the petri-dish, surrounded by 4 pea seeds that have had the present seed treatment composition applied.

Culture medium: 100 mm diameter plates of CMA (corn meal agar) was the media used for culture maintenance and the production of sporangia (source of zoospores) and was the media chosen for the experiment due to its nutrient properties that promotes growth that favors the formation of sporangia where zoospores originate.

One petri-dish plate was source culture used for entire experiment 5 mm plugs.

On the same day, seeds and inoculation plug were placed into each petri-dish.

The experiment was conducted in the dark with an incubation temperature of constant 22° C. Petri-dishes were in a tub with lid as to not dry out. No significant condensation was present on lids. Shoots eventually popped petri-dish lid off, but it was not a factor as plates did not dry out since they were in a plastic tub with lid.

Observed Results

TABLE 6

| | Treatment name | Conc. (g/l) | Rate of application ml/100 kg | Observed results | | | |
|---|---|---|---|---|---|---|---|
| | | | | Root rot damage (%) | Seed mortality (%) | Shoot presence (%) | Root weight (mg) |
| No. | | | | | | | |
| 1. | Ipconazole + Carboxin + Metalaxyl | Ipconazole at 5.0 gai/L, Carboxin at 133.3 gai/L Metalaxyl at 13.3 gai/L | 500 | 0.0 | 6.7 | 83 | 505 |

TREATMENT COMPOSITION & OBSERVED PLANT GROWTH PARAMETERS AT 1X RATE OF APHANOMYCES INFECTION

It is observed that the seed mortality is considerably reduced in pea seeds treated with the present composition. The high value of shoot presence and the root weight are indicative of the improved plant health for seeds treated with the aforementioned treatment composition.

Example 5: Wide Spectrum Phyto-Pathogenic Activity of the Present Composition

The present composition was evaluated for its fungicidal activity across a wide spectrum of fungi. A substantial control of the phytopathogenic fungi was observed accompanied with absolute suppression of certain fungi.

Treatment Conditions

Premix composition: ipconazole 5.0 gai/L, carboxin: 133.3 gai/L; and metalaxyl: 13.3 gai/L Application rate: 500 mL/100 kg Delivery rate: 2.5 gai/100 kg seed of ipconazole, 67 gai/100 kg seed of carboxin and 6.7 gai/100 kg seed of metalaxyl.

The table provided herein below lists the different fungi against which the present composition is used successfully to control seed rot, seedling blight, and damping off.

TABLE 7

| Application rate of combination g · ai/100 kg | Ipconazole + Carboxin + metalaxyl 2.5 + 67 + 6.7 |
|---|---|
| *Penicillium* spp. (seed rot) | Controlled |
| *Aspergillus* spp. (seed rot) | Controlled |
| *Rhizoctonia* (seed rot) | Controlled |
| *Rhizoctonia* (damping off) | Controlled |
| *Rhizoctonia* (seedling blight) | Controlled |
| *Fusarium* spp. (seed rot) | Controlled |
| *Fusarium* spp. (damping off) | Controlled |
| *Fusarium* spp. (seedling blight) | Controlled |
| *Pythium* spp. (seed rot) | Controlled |
| *Pythium* spp. (damping off) | Controlled |
| *Pythium* spp. (seedling blight) | Controlled |
| *Rhizoctonia* (seedling root rot) | Controlled |
| *Fusarium* (seedling root rot) | Suppressed |
| *Phomopsis longicolla* (seed rot) | Controlled |
| *Fusarium virguliforme* (sudden death syndrome) | Suppressed |

Observations

When applied at 500 mL/100 kg of seed to pulse crops, the present combination controls:

seed rot caused by *Penicillium* ssp. and *Aspergillus* spp., seed rot/pre emergence damping off, post emergence damping off and seedling blight caused by *Rhizoctonia solani, Fusarium* spp. and *Pythium* spp.;

seedling root rot caused by *Rhizoctonia solani*; and suppresses seedling root rot caused by *Fusarium* spp. and early season root rot caused by *Aphanomyces euteiches*

Advantages of the Invention

The seeds of leguminous crops treated with the present composition according to the method described in the present disclosure provide for a significant reduction in root rot damage caused by a high degree of *Aphanomyces* infection compared to the individual treatments.

The method employed by the present disclosure indicates the sustained and effective control of *Aphanomyces euteiches* in field pea crop, even after a period of one month.

The method employed by the present disclosure further helps in enhancing plant yield and health, in terms of seed emergence/germination, plant height and root weight in leguminous crops which are susceptible to infection by *Aphanomyces*.

An improvement in plant health has been measured in terms of a percentage increase in seed emergence, plant height, shoot presence, root weight accompanied with a percentage reduction in seed mortality and infection and other such parameters in crops treated with the present composition.

The present composition exhibits fungicidal activity across a wide spectrum of phytopathogenic fungi causing seed decay, damping-off, seedling blight, root rot, and wilt. The multi-mode combination with both contact and systemic activity offers maximum protection against a broad-spectrum of seed and seedling diseases in pulses and cereals. Thus, the method employed by the present inventor's aid in improving plant growth parameters and plant health.

The invention claimed is:

1. A method of controlling the growth of *Ascochyta* sp. in crop plants, said method comprising:
   contacting or applying to foliage, a seed, or a locus of the crop plants an effective amount of a fungicidal combination comprising:
   (a) ipconazole,
   (b) metalaxyl or a salt thereof, and
   (c) carboxin,
   wherein the ipconazole, metalaxyl and carboxin are admixed in a weight ratio of 1-5:1-10:1-40, respectively,
   wherein the ipconazole, metalaxyl and carboxin are the only fungicides applied;
   wherein the crop plants are in *Ascochyta* sp. infested soil; and
   wherein the fungicidal combination is effective in controlling the growth of the *Ascochyta* sp.

2. The method of claim 1, wherein the crop plants are one or more of peas, beans, lentils, and legumes.

3. The method of claim 1, wherein the fungicidal combination further comprises a liquid carrier and is applied at a rate ranging from 200 ml/100 kg to 600 ml/100 kg to seed of the crop plants.

4. The method of claim 1, wherein the ipconazole, metalaxyl and carboxin are in the form of a liquid composition, and wherein:
   the delivery rate of ipconazole to seed of the crop plants is in the range of 0.5 g a.i./100 kg to 3 g a.i./100 kg;
   the delivery rate of metalaxyl to seed of the crop plants is in the range of 4 g a.i./100 kg to 8 g a.i./100 kg, and
   the delivery rate of carboxin to seed of the crop plants is in the range of 50 g a.i./100 kg to 70 g a.i./100 kg.

5. The method of claim 1, wherein the ipconazole, metalaxyl and carboxin are admixed in a weight ratio of 1-5:1-10:1-20, respectively.

6. A method of controlling the growth of *Ascochyta* sp. in legumes, the method comprising:
   contacting or applying to foliage, a seed, or a locus of the legumes an effective amount of a fungicidal combination comprising:
   (a) ipconazole,
   (b) metalaxyl or a salt thereof, and
   (c) carboxin,
   wherein the ipconazole, metalaxyl and carboxin are admixed in a weight ratio of 1-5: 1-15:20-40, respectively,
   wherein the ipconazole, metalaxyl and carboxin are the only fungicides applied; and
   wherein the legumes are in *Ascochyta* sp. infested soil; and
   wherein the effective amount of the fungicidal combination reduces *Ascochyta* sp. growth.

\* \* \* \* \*